United States Patent [19]
Kraft et al.

[11] Patent Number: 5,911,307
[45] Date of Patent: Jun. 15, 1999

[54] CONVEYOR BELT AND METHOD OF MANUFACTURING

[75] Inventors: Klaus H. Kraft, Glenview, Ill.; Boaz Raam, Cresskill, N.J.

[73] Assignees: Burrel Leder Beltech, Inc., Skokie, Ill.; Subcon Products, Inc., Totowa, N.J.

[21] Appl. No.: 08/740,586

[22] Filed: Oct. 31, 1996

[51] Int. Cl.⁶ .................................................. B65G 15/34
[52] U.S. Cl. .......................................... 198/847; 198/846
[58] Field of Search .................... 198/833, 834, 198/835, 846, 847

[56] References Cited

U.S. PATENT DOCUMENTS

| | | |
|---|---|---|
| 20,564 | 6/1858 | Jewell . |
| 1,280,716 | 10/1918 | Grean . |
| 1,998,011 | 4/1935 | Gladwin ................................... 74/232 |
| 2,912,722 | 11/1959 | Howell ............................... 198/846 X |
| 2,985,222 | 5/1961 | Marty et al. ............................... 154/4 |
| 3,050,178 | 8/1962 | Stone .................................. 198/846 X |
| 3,656,360 | 4/1972 | Fix ........................................... 74/234 |
| 3,666,085 | 5/1972 | Folkes ..................................... 198/847 |
| 3,736,805 | 6/1973 | Dent .................................. 198/847 X |
| 3,967,720 | 7/1976 | Arieh ................................. 198/847 X |
| 4,127,040 | 11/1978 | Moore et al. .............................. 74/240 |
| 4,270,656 | 6/1981 | Chesmer et al. ......................... 198/847 |
| 4,533,420 | 8/1985 | Wetzel ................................. 198/847 X |
| 5,195,737 | 3/1993 | Ifkovits, Jr. et al. ............... 198/83.5 X |
| 5,211,608 | 5/1993 | Wong et al. ............................. 474/202 |
| 5,342,250 | 8/1994 | Sanders ................................... 474/249 |

FOREIGN PATENT DOCUMENTS

| | | | |
|---|---|---|---|
| 689124 | 9/1930 | France ........................................... 3/5 |
| 4139524 | 6/1993 | Germany ................................ 198/846 |
| 259436 | 10/1926 | United Kingdom . |

*Primary Examiner*—James R. Bidwell
*Attorney, Agent, or Firm*—Hill & Simpson

[57] ABSTRACT

A conveyor belt and a method of manufacturing are provided. The conveyor belt includes a flat belt, having a topside, a pulley side, a first outer edge and a second outer edge. The conveyor belt further includes a timing belt with timing teeth extending from the pulley side. The conveyor belt is used in a conveyor belt system including a drive roller having a gear portion shaped complementary to the timing teeth of the flat belt. The drive roller is arranged to engage with the pulley side of the flat belt. The conveyor belt system further includes a tail roller which also includes a gear portion shaped complementary to the timing teeth of the flat belt and arranged to engage with the pulley side of the flat belt.

20 Claims, 2 Drawing Sheets

CONVEYOR BELT AND METHOD OF MANUFACTURING

TECHNICAL FIELD OF THE INVENTION

The present invention relates to a conveyor belt and a method of manufacturing, and particularly to conveyor belts used in the food processing industry.

BACKGROUND OF THE INVENTION

Traditionally flat conveyor belts move product from point A to point B by carrying the product along a pre-defined route or track. Flat conveyor belt motion is driven by the contact between the belt and the drive pulley. The load on the belt is evenly distributed along the contact surface of the drive pulley.

Traditionally flat homogeneous belts are used in conveyor systems where cleanliness is of paramount importance. The term "homogeneous belt", as used herein, is an industry term that generally refers to an extruded belt or one made from a single material and is not reinforced. These belts provide a smooth continuous surface. Their non-absorbing surface allows for easy cleaning of spilled contaminants or remains from the manufacturing process. These belts are not likely to be carrying foreign materials which might contaminate the product being conveyed.

Belts of this type are driven by a pulley, generally at one end of the conveyor assembly. To ensure that the pulley has sufficient force to drive the belt, belts are pretensioned. Pretensioning is the placing of the belt under tension so that the friction between the belt and the drive pulley is sufficient to ensure that the belt does not slip against the surface of the pulley.

While pretensioning ensures that the pulley will drive the belt, there are resultant unavoidable issues. A properly pretensioned belt will slip against the surface of the pulley when lubricated with oils or other contaminants. Pretensioning by definition means stretching the belt. Homogeneous belts do stretch. Stretched belts require repretensioning at intervals determined by the stretching force applied to the belts. Belt stretching requires replacement after exceeding stretch limits.

Additionally, the load will also affect the stretch of the belt. Pretensioning also requires the additional cost associated with ensuring that the conveyor frame bed be sufficiently strong enough to withstand the stress placed on it. Further, improperly aligned belts will mis-track resulting in damaged belt edges and a shorter belt life.

Timing belts are used for accurate timed and indexed transmission of power from one drive wheel to another slave wheel. The drive wheel is notched with a pattern opposite to that of the timing belt. As the drive wheel rotates protrusions in the timing belt embed into depressions in the drive pulley forcing the belt to move.

Modular plastic chains and belting does meet the needs as far as positive driving and tracking are concerned, but they are a haven for dirt, product residue, bacteria, etc., and they are difficult, if not nearly impossible, to clean quickly or efficiently.

The present invention is directed to overcoming the above problems as well as other problems associated with the prior art conveyor belts.

SUMMARY OF THE INVENTION

It is an object of the present invention to provide a conveyor belt which does not require pretensioning.

It is a further object of the present invention to provide a conveyor belt wherein the supporting conveyor frame may be constructed with a light weight design.

It is still a further object of the present invention to provide a conveyor belt which will track and not wander on the conveyor, and wherein the motion is positive and can be indexed.

It is yet another object of the present invention to provide a conveyor belt which can move high loads.

It is still yet a further object of the present invention to provide a conveyor belt wherein the drive motion is not affected by contamination.

And yet another object of the present invention, a conveyor belt is provided in which sanitization is easily maintained.

The present invention provides a reinforced or homogeneous type conveyor belt and a method of manufacturing. The present invention therefore provides a conveyor belt, having a flat belt with a topside, a pulley side, a first outer edge and a second outer edge, and a timing belt with timing teeth extending from the pulley side.

DETAILED DESCRIPTION OF THE PRESENT INVENTION

Figure 1:
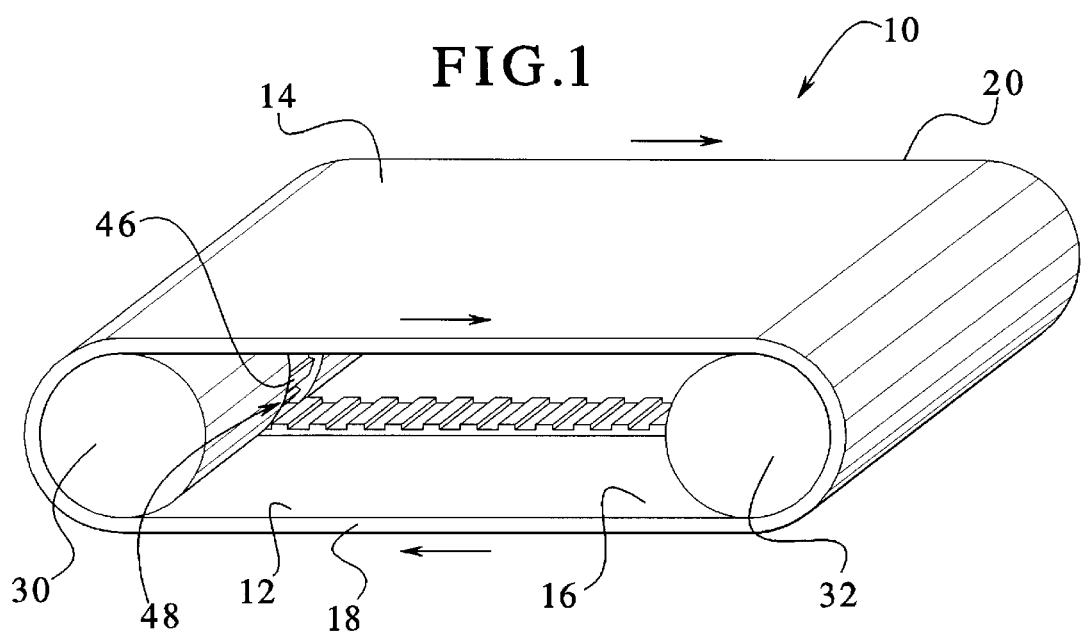
FIG. 1 is a perspective view of the conveyor belt system of the present invention.

Referring to FIG. 1, a homogeneous conveyor belt 10, is shown to include a flat belt 12, having a topside 14 and a pulley side 16. The flat belt 12 further includes a first outer edge 18, and a second outer edge 20.

Figure 2:
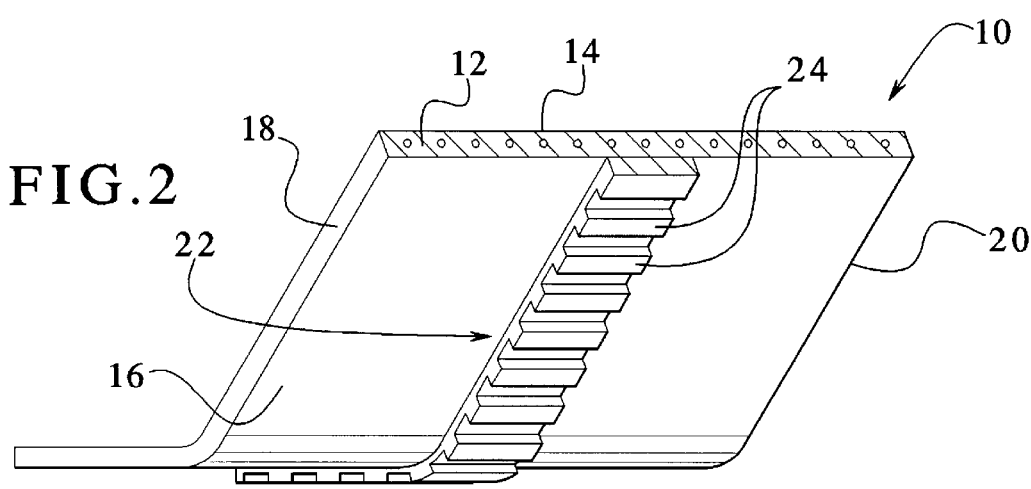
FIG. 2 is a part cross-sectional view of the conveyor belt of FIG. 1.

FIG. 2 discloses a first embodiment of the conveyor belt 10. The conveyor belt 10 is shown to include the flat belt 12. The flat belt 12 is made of solid plastic without any fabric and provides a low bacteria count. Volta Israel provides a belt which satisfies the requirements of the present invention. The topside 14 and first and second outer edges 18, 20, provide a smooth surface which may be easily cleaned and maintained.

FIG. 2 further shows a timing belt 22, having timing teeth 24, extending from the pulley side 16. The timing belt 22, is made of a reinforced or non-reinforced polyurethane. The timing belt 22, is laminated to the pulley side 16 of the flat belt 12 by a liester heat gun bonding process.

Figure 3:
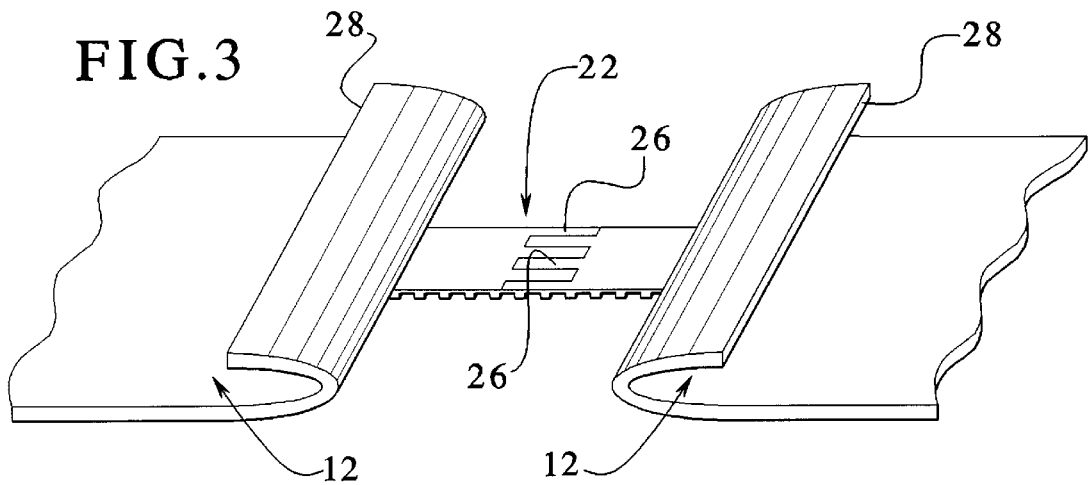
FIG. 3 is a part breakaway view of the conveyor belt of FIG. 1.

FIG. 3 discloses that the ends 26 of the timing belt 22, are spliced together to form a continuous loop. In addition, the ends 28 of the flat belt 12, are also joined to similarly form a continuous loop.

Figure 4:
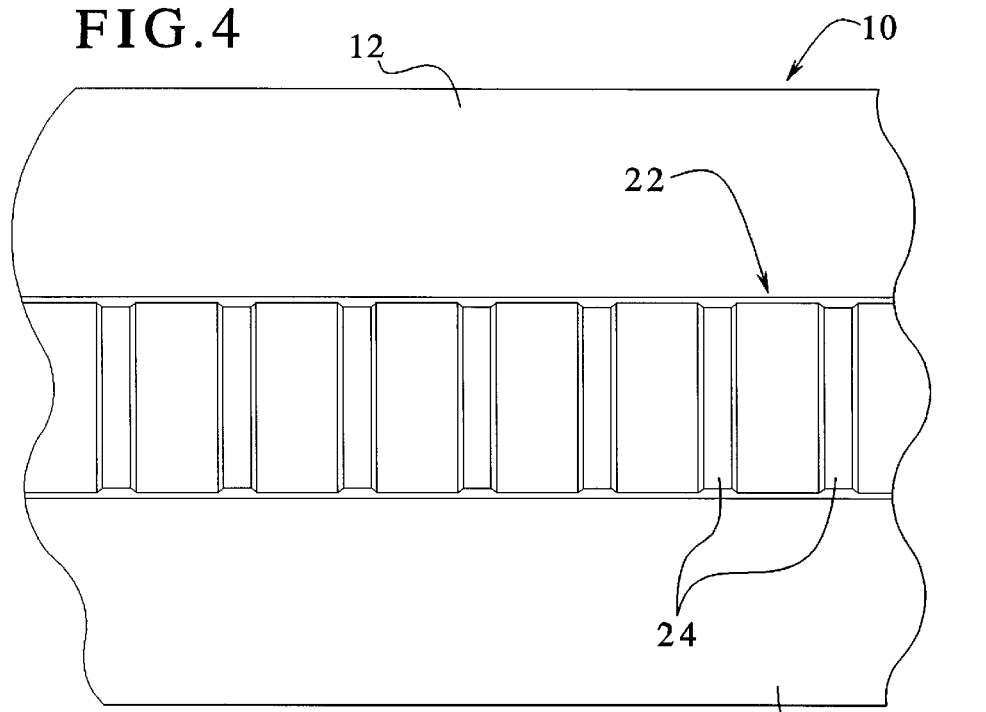
FIG. 4 is a partial view of the conveyor belt of FIG. 1.

FIG. 4 shows the manufactured conveyor belt 10, with the laminated timing belt 22, and timing teeth 24.

Figure 5:
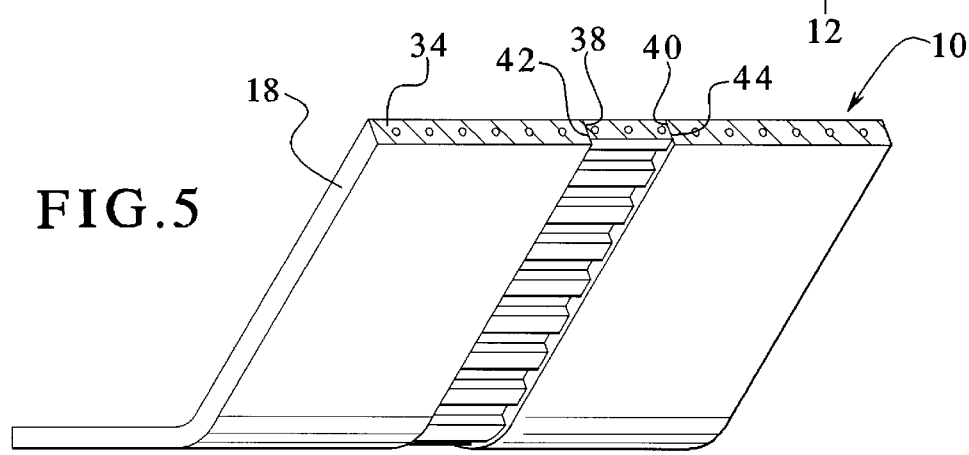
FIG. 5 is a part cross-sectional view of an alternative embodiment of the conveyor belt.

FIG. 5 discloses an alternative embodiment of the conveyor belt 10. The conveyor belt 10 is shown to include a first portion 34 and a second portion 36. The first portion 34 includes the first edge 18, and a first inner edge 38. The second portion 36 includes the second outer edge 20, and a second inner edge 40. The timing belt 22 includes a first inner edge 42 and a second inner edge 44. Similar to the first embodiment, the timing belt 22 is laminated to the flat belt 12 and, more specifically, laterally between the first belt portion 34 and the second belt portion 36 as shown in FIG. 5. However, in the alternative embodiment, the first and second inner edges 42, 44 of the timing belt 22, are heat bonded to the respective first and second inner edges 38, 40 of the flat belt 12. FIG. 5 further discloses that the timing teeth 24, extend from the pulley side 16 of the flat belt 12.

In both embodiments, the conveyor belt 10 provides a smooth surface along the topside 14 and the first and second outer edges 18, 20.

Figure 6:
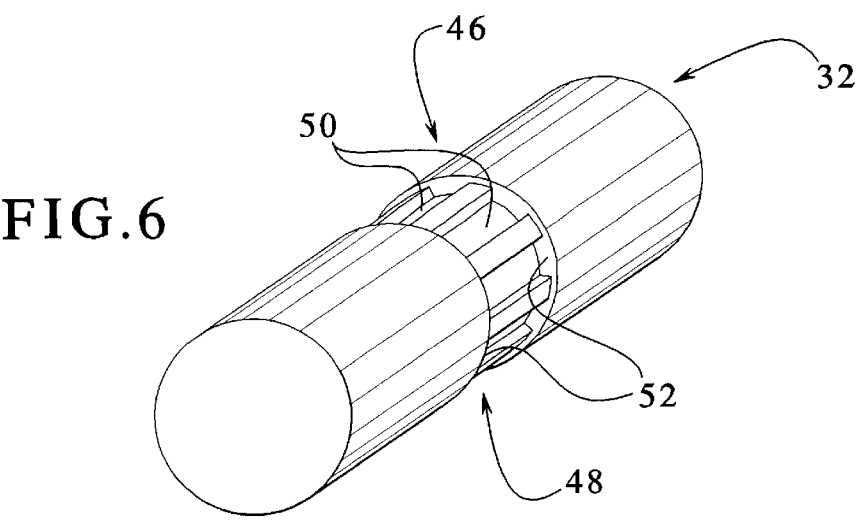
FIG. 6 is a perspective view of a pulley for the conveyor belt of FIG. 1.

With reference to FIG. 1, the completed conveyor belt 10 is assembled onto a conveyor frame (not shown) having a tail roller 30 and a drive roller 32. The tail roller 30 and drive roller 32 include a gear portion 46 at a center portion 48. FIG. 6 more clearly discloses the drive roller 32, having the gear portion 46. The gear portion 46 includes grooves 50, which are complementary-shaped to receive the timing teeth 24. The drive roller 32 is driven by a mechanical means (not shown), and in turn directly drives the conveyor belt 10, in the direction indicated by the arrows in FIG. 1.

FIG. 6 discloses that the gear portion 46 includes a recessed portion 52. The recessed portion 52 is complementary-shaped to receive the timing belt 22 of the first embodiment. However, the recessed portion 52 may be omitted for the first embodiment of the conveyor belt 10.

Although the above description refers specifically to a homogeneous type conveyor belt, the invention is equally applicable to a multilayer, or reinforced conveyor belt.

The foregoing detailed description has been given for clearness of understanding only and no unnecessary limitations should be understood therefrom.

We claim:

1. A conveyor belt, comprising:
   a flat belt having a topside, a pulley side, a first outer edge and a second outer edge; and
   a timing belt having a topside and a pulley side, the topside of the timing belt being heat bonded to the pulley side of the flat belt, the pulley side of the timing belt having timing teeth extending therefrom.

2. The conveyor belt of claim 1, wherein the topside of the flat belt having a smooth surface extending from the first edge to the second edge.

3. The conveyor belt of claim 2; wherein the first outer edge and second outer edge each include a smooth surface.

4. The conveyor belt of claim 1, wherein the flat belt is made of a material having a low bacterial count.

5. The conveyor belt of claim 1, wherein the flat belt is made of plastic.

6. The conveyor belt of claim 1, wherein the flat belt is made of nonreinforced plastic.

7. The conveyor belt of claim 1, wherein the timing belt is made of reinforced polyurethane.

8. The conveyor belt of claim 1, wherein the timing belt is made of nonreinforced polyurethane.

9. The conveyor belt of claim 1, wherein the width from the first edge to the second edge is in the range of ½ inch to 4 inches.

10. A conveyor belt, comprising:
    a flat belt having a topside, a pulley side, a first outer edge and a second outer edge;
    a timing belt with timing teeth extending from the pulley side; and
    the flat belt including a first portion and a second portion, the first portion having the first outer edge and a first inner edge, and the second portion having the second outer edge and a second inner edge, the timing belt having a first edge and a second edge, the first inner edge is laminated to the timing belt first edge, and the timing belt second edge is laminated to the second inner edge.

11. A method of manufacturing a conveyor belt, comprising:
    forming a timing belt with timing teeth;
    arranging the timing belt laterally between a first flat belt portion and a second flat belt portion with the timing teeth extending from a pulley side of the timing belt; and
    laminating the timing belt laterally between the first and second flat belt portions.

12. The method of claim 11, wherein the step of arranging further comprises arranging a top surface of the timing belt to be even with a top surface of the first and second flat belt portions.

13. A conveyor belt system, comprising:
    a flat belt having a topside and a pulley side;
    a timing belt having a topside and a pulley side, the topside of the timing belt being laminated to the pulley side of the flat belt and the pulley side of the timing belt having timing teeth extending therefrom;
    a drive roller having a gear portion shaped complementary to the timing teeth of the flat belt, the drive roller engages with the pulley side of the flat belt; and
    a tail roller, whereby the drive roller transfers motion power to the flat belt.

14. A method of manufacturing a conveyor belt, comprising:
    forming a timing belt with a topside and a pulley side, the pulley side of the timing belt having timing teeth extending therefrom;
    arranging the topside timing belt adjacent a pulley side of a flat belt with the timing teeth extending from a pulley side of the flat belt; and
    laminating the topside of the timing belt to the pulley side of the flat belt.

15. The method of claim 14, wherein the step of arranging further comprises:
    arranging the timing belt at a center of the pulley side of the flat belt.

16. The method of claim 14, wherein the step of arranging comprises:
    arranging the timing belt between a first flat belt portion and a second flat belt portion, with the timing teeth extending from a pulley side of the timing belt.

17. The method of claim 16, wherein the step of arranging further comprises arranging a top surface of the timing belt to be even with a top surface of the first and second flat belt portions.

18. The method of claim 14, wherein the step of laminating is by a heat gun bonding process.

19. The method of claim 14, further comprising the step of connecting the respective ends of the flat belt and timing belt.

20. A conveyor belt, comprising:
    a flat belt having a topside, a pulley side, a first outer edge and a second outer edge; and
    a timing belt having a topside and a pulley side, the topside of the timing belt being laminated to the pulley side of the flat belt, the pulley side of the timing belt having timing teeth extending therefrom.

* * * * *